(12) United States Patent
Evans, Jr. et al.

(10) Patent No.: US 6,505,137 B1
(45) Date of Patent: Jan. 7, 2003

(54) METHOD FOR OPERATING A TEST SYSTEM

(75) Inventors: Joseph T. Evans, Jr., Albuquerque, NM (US); Scott P. Chapman, Albuquerque, NM (US)

(73) Assignee: Radiant Technologies, Inc., Albuquerque, NM (US)

(*) Notice: Subject to any disclaimer, the term of this patent is extended or adjusted under 35 U.S.C. 154(b) by 0 days.

(21) Appl. No.: 09/399,130

(22) Filed: Sep. 20, 1999

(51) Int. Cl.[7] .............................................. G06F 19/00
(52) U.S. Cl. ...................... 702/119; 702/118; 716/11; 716/12
(58) Field of Search .................... 702/108, 118–123; 703/13–14; 714/26–27, 30, 124; 345/357, 346, 349; 716/11–12

(56) References Cited

U.S. PATENT DOCUMENTS

| | | | | |
|---|---|---|---|---|
| 4,970,644 A | * | 11/1990 | Berneking et al. ............. | 714/3 |
| 5,111,413 A | * | 5/1992 | Lazansky et al. .............. | 703/13 |
| 5,325,309 A | * | 6/1994 | Halaviati et al. .............. | 703/15 |
| 5,731,984 A | * | 3/1998 | Ullmann ...................... | 702/108 |
| 5,917,492 A | * | 6/1999 | Bereiter et al. ............. | 345/357 |
| 5,925,145 A | * | 7/1999 | Illes et al. .................. | 714/738 |
| 6,002,868 A | * | 12/1999 | Jenkins et al. .............. | 702/119 |

* cited by examiner

Primary Examiner—Bryan Bui
(74) Attorney, Agent, or Firm—Calvin B. Ward

(57) ABSTRACT

A method for operating a data processing system to control a device under test and to collect data from that device. The user is provided with a first display having a list of elementary tasks having first and second tasks from which a user selects one or more elementary tasks. The first task applies a signal to the device under test when that task is executed and the second task causes the data processing system to receive data from the device under test. The user edits task parameters using a second display to provide a current test definition. In response to user input, the data processing system executes each of the tasks in the current test definition and stores any data received from the device under test in a data set that includes the current test definition and which is displayed in a third display.

15 Claims, 2 Drawing Sheets

METHOD FOR OPERATING A TEST SYSTEM

FIELD OF THE INVENTION

The present invention relates to testing systems, and more particularly, to a method for operating a computer to better control a test system for testing electrical components.

BACKGROUND OF THE INVENTION

For the purposes of this discussion, a testing system is defined to be a system that applies various signals to a circuit or circuit element and measures the response of the circuit or element to those signals. Integrated circuit testers have been known to the art for some time. To perform tests, the testing system requires, among other data, a description of the tests to be performed and a description of the order in which the tests are to be executed.

There are several conventional techniques for specifying this information. In one type of system, the tests and test flow are described in a test program which controls the tester. Here, the description is embodied in a computer program in one of the conventional programming languages. The user must rely on a program provided by the test system manufacturer or be competent in programming. Further, each time the program is altered, the user must recompile the program. If the test system is being utilized in a quality control environment in which a large number of parts are being run through the same test, the programming overhead can be easily amortized. If, however, the testing system is being used to understand the performance of a few devices as part of a research and development program, the time needed to perform these programming tasks becomes significant. The required programming effort makes it difficult for an engineer to experiment with a device to ascertain detailed information that was not contemplated by the test system manufacturer.

The collection of data from a series of tests also presents problems with conventional test systems. In general, the test system will store the results of a specific test in a file for the user. The user is then left with the task of keeping track of the files. In many test situations, knowledge of the history of each device being tested is important to the understanding of the test results. Prior art systems do not provide a convenient method for storing this history. In principle, the user can use the date stamps on the test data files to keep track of the device history. However, this requires that each test protocol generate some sort of data file. If a particular test does not generate a test data file, the user has no way of determining the history of the device during testing. For example, consider a tester for ferroelectric capacitors. The response of each capacitor will often change over repeated data storage cycles. A capacitor tester typically measures the hysteresis loop for the capacitor and records the information in a file. Consider a test protocol consisting of measuring a hysteresis loop, cycling the capacitor through a number of storage cycles, and then measuring a second hysteresis loop. In a typical prior art test system, the cycling of the capacitor generates no data files, since nothing is measured during the cycling. Hence, the user must make some form of manual entry to keep track of this step.

In addition, the files generated by prior art test systems can be altered by the user. Hence, there is no guarantee that any given file contains the original test data after that file has been examined by several users over a long period of time.

In general, most testing regimens can be broken down into elementary tasks such as measuring a hysteresis loop for a capacitor as described above. Some subset of these elementary tasks is provided by the manufacturer of the test system. These tasks will, in general, require a computer programmer to generate the code needed to control the tester during the execution of the elementary task. If a user needs a new elementary task defined for a tester, the user is usually out of luck, unless he can interest the manufacturer in providing that new task. In most test systems, there is no easy method for inserting one new task. Hence, even if the manufacturer is willing to provide the code, the user must usually wait for some later update of the tester software. Further, the cost of providing the code for a new elementary task can be quite substantial. Accordingly, the manufacturer will not be willing to provide the code unless the task is one that a large number of users wants or the manufacturer can recoup the cost by spreading the cost over one or more users. Prior art test systems do not provide a convenient method for inserting new tasks that can only be used by users that have paid an additional fee for the privilege of using the task on the user's tester. Hence, interesting a programmer or the manufacturer in coding a new test is difficult.

Broadly, it is the object of the present invention to provide an improved test system.

It is a further object of the present invention to provide a test system that allows the user to easily specify the tests to be performed on a device without being a computer programmer.

It is a still further object of the present invention to provide a test system that provides a convenient method for introducing new elementary tests into the test repertoire.

It is yet another object of the present invention to provide a test system that can utilize proprietary elementary test protocols while limiting the use of those protocols to specified users.

These and other objects of the present invention will become apparent to those skilled in the art from the following detailed description of the invention and the accompanying drawings.

SUMMARY OF THE INVENTION

The present invention is a method for operating a data processing system to control a device under test and to collect data from that device. The user is provided with a first display having a list of elementary tasks from which a user selects one or more elementary tasks using a pointing device. The task list includes first and second tasks. The first task applies a signal to the device under test when that task is executed by the data processing system and the second task causes the data processing system to receive data determined by the signals generated by the device under test. The invention also provides a second display from which the user can edit parameters in the tasks and from which the user can order the selected tasks to provide a current test definition. The user causes the system to execute a test based on the current test definition by selecting a graphical display element. The data processing system then executes each of the tasks in order in the current test definition and stores any data received from the device under test as a result thereof in a data set. The data set is displayed in a third display. Information specifying the current test definition is also stored in the data set. The list of elementary tasks can be expanded to include the current test definition as a new elementary task by dragging the current test definition from the second or third display to the first display. In the preferred embodiment of the present invention, the elementary tasks are constructed from objects in an object oriented computing model. The elementary tasks that collect data include a display method for displaying the data received from the device under test, which is invoked by selecting the elementary task in the third display. In the preferred embodiment of the present invention, the data processing system stores a system identification number. A third class of tasks includes a corresponding enabled identification number that restricts tasks of this class with respect to applying signals to the device under test and collects data therefrom to systems in which the enabled identification number matches the system identification number. Data sets may also be imported and exported to computer files. If a data set includes a task of the third class, an imported data set will still display the data in that task even on systems for which the task is not enabled with respect to data collection.

DETAILED DESCRIPTION OF THE INVENTION

Figure 1:
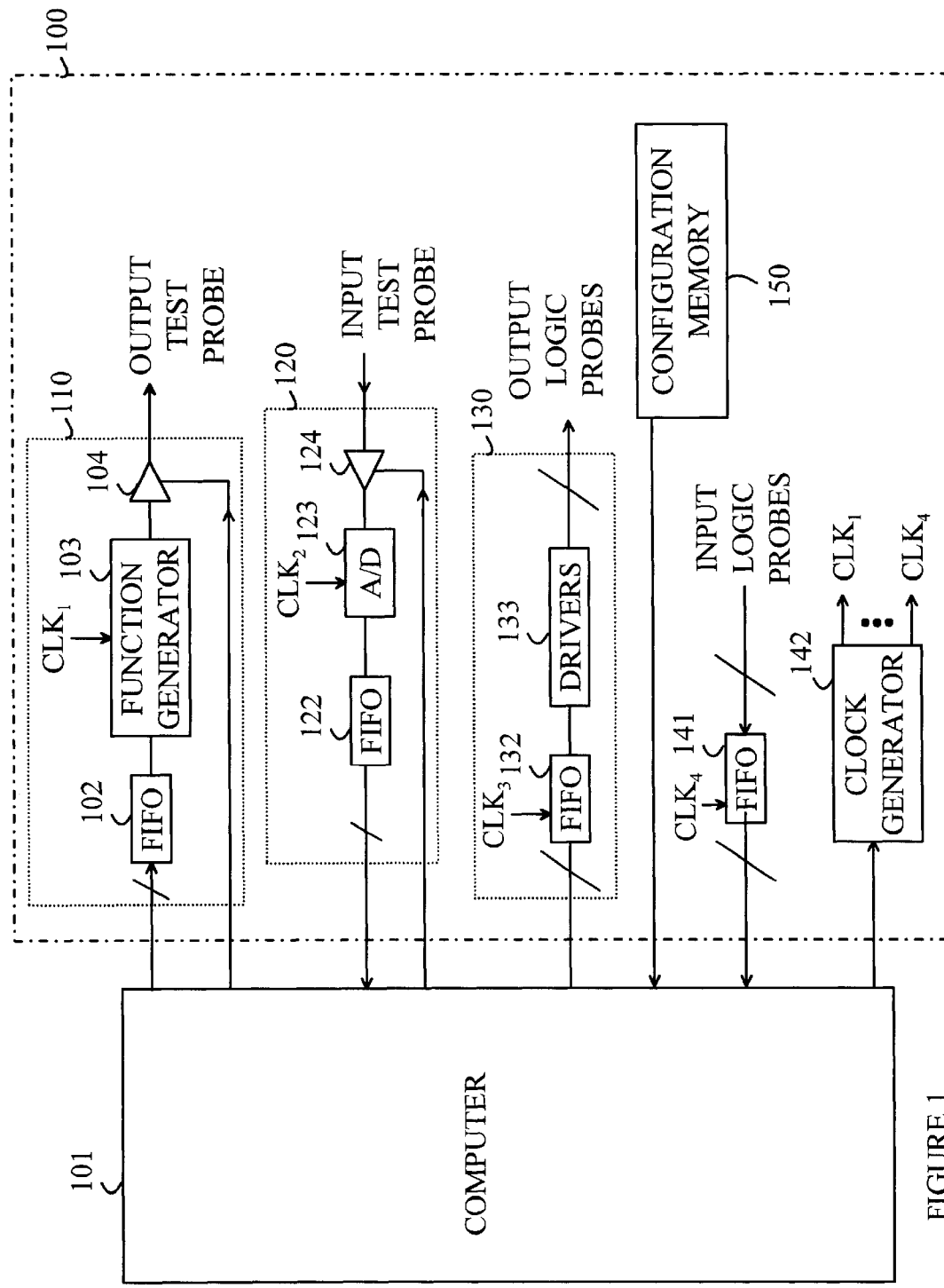
FIG. 1 is a block diagram of a testing system according to the present invention.

Refer now to FIG. 1 which is a block diagram of the preferred embodiment of a testing system according to the present invention. The system includes a software component that runs on a computer 101 and a hardware interface 100 that receives digital signals from computer 101 and delivers data back to computer 101. Hardware interface 100 acts as a bi-directional interface for both analog and digital signals that are to be applied to a device under test. The analog signals used to "stimulate" the device under test are generated from a digital representation thereof by an analog output circuit 110. Analog output circuit 110 includes a function generator 103 that receives an array of digital values representing the desired signal level as a function of time. The digital values are downloaded into a FIFO buffer 102 by the software component of the present invention. A programmable amplifier 104 having a gain that is under the control of computer 101 sets the final analog signal range. The analog signal is then coupled to the device under test via an output test probe. The analog signal can be either a voltage or current based signal. In the preferred embodiment of the present invention, amplifier 104 also includes the appropriate conversion circuits for converting a voltage signal generated by function generator 103 to a signal having the desired current as a function of time. The rate at which the values stored in FIFO 102 are shifted out to the device under test is controlled by a clock signal CLK1 that is generated from a clock generator 142 that is also under computer control.

The combination of the FIFO 102 and the clocked function generator allows the present invention to generate an analog signal without relying on computer 101 for timing control. This feature of the invention is particularly useful when the software component of the invention is running under an operating system that does not provide direct control of the output ports with predictable delays.

Analog signals are returned to computer 101 in an analogous manner by an analog input circuit 120. The analog signal of interest is coupled to analog input circuit 120 via an input test probe that is connected to the appropriate location in the device under test. An input amplifier 124 having a gain that is under the control of computer 101 is used to scale the signal to the desired range and make voltage-to-current or current-to-voltage conversions. The scaled signal is digitized by an analog-to-digital converter 123 at a rate determined by a second clock signal CLK2. The resulting values are stored in FIFO 122, which is read-out under computer control. FIFO 122 reduces the timing control needed from the computer.

While the hardware embodiment shown in FIG. 1 has only one analog input channel and one analog output channel, an arbitrary number of such channels can be included. Since each channel is buffered, the computer can either be connected to all of the channels simultaneously or via a multiplexing circuit.

In addition to the analog input and output circuits, the preferred embodiment of the present invention also includes a digital output circuit 130 for coupling digital signals to the device under test and a digital input circuit having a FIFO 141 for receiving digital signals from the device under test. The digital output circuit stores a sequence of control signals in FIFO 132 and then shifts those signals out to the circuit under test via a set of drivers 133. The width of the buses determines the number of individual signals provided. Similarly, the logic signals generated by the device under test are shifted into FIFO 141 which is read out by computer 101.

As noted above, the various timing operations are controlled by a plurality of clock signals that are preferably generated by clock generator 142 which is under the control of computer 101. While the drawing shows individual clock signals, it will be appreciated that a single clock signal can be used to provide the timing for all of the data input and output functions.

The FIFO buffered inputs and outputs discussed above allow the present invention to operate with a variety of communication links between computer 101 and hardware interface 100. In the preferred embodiment of the present invention, hardware interface 100 is connected to computer 101 via one or more parallel ports on computer 101. However, other communication channels may be utilized such as serial links or a combination of parallel and serial links. In addition, the communication paths may include segments that include local area networks or even wide area networks such as the Internet. Hence, the present invention may be configured such that the software component operating on one computer directs tests of a device connected to a hardware interface connected to another computer at a remote location via the Internet.

The software component of the present invention utilizes a class of objects referred to as a "Task" to control the execution of elementary tasks which apply specific stimuli to the device under test and record voltages or currents produced in, or by, the device under test. In general, a Task executes some function for the user and is provided by the system manufacturer in a task library. Each instance of a Task has a default configuration that is inherited from a class generator in the library; however, the present invention provides an editor that allows the default configuration to be altered. An instance of a Task may acquire data and store that data as discussed below. An instance of a Task also performs computations on the data stored therein including displaying that data or exporting data. However, once acquired, the data stored in an instance of a Task cannot be altered.

Tasks can be viewed as belonging to three general categories. The first category, referred to as "measurement Tasks", applies signals to the circuit under test and collects data therefrom. For example, a Task in this category measures the hysteresis loop for a capacitor connected to the input and output test probes. This Task may also display the data collected. A more general stimulation task might include an array of signal values loaded by the user to be applied to the circuit under test. This Task would then collect the analog input values from FIFO 122. Once again, this Task may include methods for displaying the collected data. It should be noted that Tasks in this category do not need to provide a stimulation signal or collect data. For example, a Task might apply a stimulation signal without collecting any data. A Task that set a heater in the test setup and allowed the circuit to "cook" for a predetermined period of time would fall into this type of Task. Similarly, a Task that measured a circuit output without providing any stimulus would fall into this type of Task. Finally, a Task in this category might just provide a delay interval between two other Tasks.

The second class of Tasks are used for programming the flow of the overall test. As will be discussed in more detail below, the present invention provides a programming arrangement that implements certain common programming functions such as loops and branches. These functions are treated like any other Task in the present invention.

Finally, a third class of Tasks, referred to as "filters", perform computations on the data collected by other Tasks to generate a calculated data set. For example, a filter can be used to average a sequence of measured hysteresis curves to generate an averaged curve. Data display operations are preferably carried out by filter Tasks. In the preferred embodiment of the present invention, one of the configuration parameters in the filter determines if the filter will display the results computed by the filter. This provides a means for preventing system overload because of too many display windows when the Current Test Definition includes a filter in a loop.

In the preferred embodiment of the present invention, all display operations are performed by filters. Each measurement Task has a corresponding filter Task that displays the data acquired by the measurement task. If the Current Test Definition does not include a filter connected to a particular measurement Task and the user indicates that he wishes to view the data collected by the measurement Task, the default filter Task for that type of measurement Task will be invoked to display the collected data.

Figure 2:
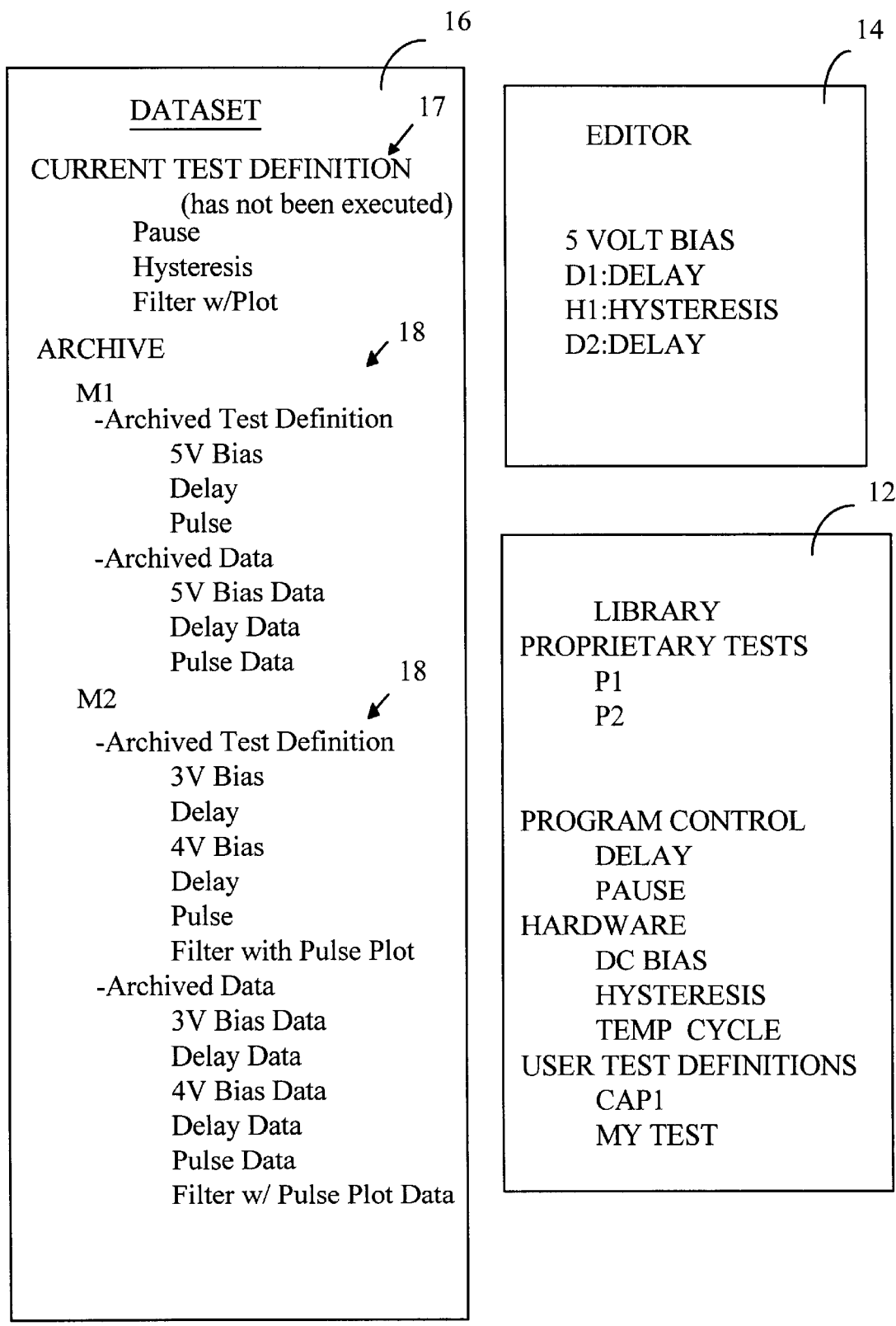
FIG. 2 illustrates the display screen utilized by the user to control a test.

Refer now to FIG. 2, which illustrates the display screen utilized by a user of the present invention to control a test. In the present invention, the user defines a "Current Test Definition" that consists of an ordered list of Tasks. The user builds the Current Test Definition by selecting Tasks from the Task Library, which is presented to the user in a first window shown at 12 and dragging the Task to the Editor window 14.

Each Task, in general, has one or more configuration parameters that may be altered by the user. A Task generated from the Task Library by dragging it to the editor window has default values for each of these parameters. The user may edit the default Task configuration to meet the user's needs during the construction of the Current Test Definition by selecting the Task and then selecting an editor command. In the preferred embodiment of the present invention, double clicking on the Task in the Editor window brings up a window containing the configuration parameters that may be altered.

As noted above, some Tasks do not generate any data. For example, a Task can be defined that exercises a part by applying a sequence of signals to the part for a defined number of cycles. A subsequent Task would then measure some characteristic of the part.

As noted above, the present invention implements program flow controls such as loops and branches. A loop or branch is treated like any other Task. The user selects the loop Task from the library and drags it to the editor window. When the Task is opened in the editor window, the user is given access to the variables that define the loop condition. The user also specifies the point in the Current Test Definition at which the program is to loop if the condition is not satisfied. To aid the user, the present invention provides a set of global variables that can be set or read by any Task. The user typically references these variables when defining the loop condition. Branches are treated in a similar manner. If the loop condition is to rely on the results of some previous circuit measurement, the user can use a filter to perform the needed computation and store the result in one of the global variables.

Once the Current Test Definition is completed, the test can be executed to create a "Dataset" which appears in a third window 16. In the preferred embodiment of the present invention, a graphical element either in the form of a menu item or icon is clicked to cause the Current Test Definition to execute the Tasks therein.

The software component of the present invention is designed to function with a wide variety of hardware interfaces or with no hardware interface at all. In general, the test systems of the present invention include a range of systems from inexpensive systems with relatively slow electronics and limited numbers of test probes to more expensive systems that function at very high clock rates and include large numbers of test probes. The specific capabilities of each system are stored in a configuration memory 150 that can be accessed by the computer. Prior to executing the test definition for the first time, the present invention reads the configuration memory and determines if the individual Tasks in the Test Definition are configured in a manner that is compatible with the particular hardware interface currently connected to the computer. If, for example, a Task requires a clock rate or voltage range that is beyond the capabilities of the hardware interface, an error is generated and the system will not execute the Test Definition.

If no hardware interface is currently connected to the computer, the software of the present invention will still allow the user to access data that has been archived from previous tests stored on the system. The present invention allows the user to access the display methods associated with those Tasks as well. In addition, the present invention can import data collected on other test systems according to the present invention so that the user can display that data without being connected to the hardware used to collect the data.

The Dataset generated by executing the Current Test Definition has two major components: a record that defines the Current Test Definition 17 that was executed to acquire data and the data resulting from the execution shown at 18. The first time the Current Test Definition is executed, data specifying the Current Test Definition is stored in the Dataset. Each Task has a unique identification code associated with that Task. The identification code identifies a pointer in the library to the code defining the methods of that Task. Hence, given the identification code and the configuration data for each Task in the Current Test Definition, the software can construct the completed Task object.

The execution of the Current Test Definition also freezes the Current Test Definition Tasks. At this point, Tasks cannot be added or subtracted from the Current Test Definition. In addition, the order of the Tasks in the Current Test Definition cannot be altered. The configuration parameters, however, can be edited between executions of the Current Test Definition. This feature of the present invention allows the user to optimize the Current Test Definition without having to redefine the definition starting from the library each time a new set of configuration parameters is utilized. The details of the Current Test Definition may be viewed by double clicking on the Current Test Definition in window 16. Individual elements of the definition appear in a manner similar to that shown in the Editor window. The configuration parameters for each element can then be accessed by double clicking the element in question.

Each subsequent time the Current Test Definition is executed, another copy of the configuration parameters is stored in the Dataset together with the data collected in that execution of the Current Test Definition. Since the configuration is known to be the same between executions, this provides sufficient information for reconstructing all of the information that defines the test that was executed.

Each time the Current Test Definition is executed, a copy of the Current Test Definition appears in the Dataset window as shown at 18. The various executions are assigned indexed values, M1, M2, etc. in the display so that the user can separate the various executions. The user can examine the data collected in any test by selecting the specific Task in the Dataset window corresponding to the execution of interest and then selecting the appropriate data display method for that Task.

Test results are automatically archived. Any test in the archive can be exported. In addition, a test can be imported from a file created by the export command. The exported files include the Current Test Definition records used to generate the test. Hence, researchers can easily share data and test definitions.

Either the Current Test Definition or an "Archived Test Definition" stored in a Dataset can be dragged back to the Editor for use again as a test. In either case, the test definition existing in the Editor will be erased and a copy of the source test definition will be placed in the Editor. In the case of the Archived Test Definition, only the definition together with the test parameters are transferred, not the data. Hence, a first user can utilize a test definition created by a second user and exported from the archive on the second user's test system by importing the test into the first user's Dataset window and then dragging the test definition into the editor on the first user's test system.

If a user wishes to use a test definition on a more regular basis, the test definition can be placed in the Library by dragging the definition from the editor window to the Library window. In this case, a copy of the test definition is made and stored in a separate folder, referred to as the "User Defined Test Definition" folder or UDTD, in the library. Thus, the library will contain a folder for instructions for the creation of individual Tasks and a folder of instances of test definitions customized by the user and saved for future use. In the preferred embodiment of the present invention, a test definition can be dragged directly from the Current Test Definition in the Editor window or an Archived Test Definition to the UDTD folder.

In addition to user-defined Tasks and the standard library Tasks, the present invention can also utilize proprietary Task definitions. As noted above, generating a new Task can involve significant costs. If the Task utilizes new hardware in the interface between the controller and the device under test, new drivers may be needed in addition to the code for running the new hardware. To provide incentive for the creation of new Tasks, the present invention implements a proprietary Task library. Tasks from this folder in the library can only be executed on specific test systems. To implement this feature of the present invention, each system has a unique identification number. A proprietary Task can be enabled for specific systems by keying enablement to this identification number. Hence, a user can purchase the right to use a proprietary Task from a vendor of such Tasks. The vendor may be the test system manufacturer or a third party such as a user who is familiar with the workings of the test system. This provides a mechanism for authors of complex Tasks to recoup the cost of programming the Tasks.

In the preferred embodiment of the present invention, a proprietary Task is only restricted with respect to collecting data via the Task. The other methods in the Task may be utilized on any system. Hence, when a proprietary Task is contained in a test definition, the code is placed in the archive in the same manner as any other code. The results of the test may be exported to other machines that are not enabled for the proprietary Task. The users of those machines can view the data taken with the proprietary Task; however, such users cannot collect new data with the proprietary Task.

As noted above, the software component of the present invention is designed to operate on a variety of hardware interfaces. In addition to hardware interfaces of the type described above, the present invention can be configured to control other commercially available test instruments that receive digital commands and return a string of digital data. These instruments are controlled by providing appropriate measurement and filter Tasks in the library. Hence, the software component can be easily configured to control a plurality of test instruments attached to the circuit under test to provide a complex test arrangement that cannot be achieved with any single test platform.

Various modifications to the present invention will become apparent to those skilled in the art from the foregoing description and accompanying drawings. Accordingly, the present invention is to be limited solely by the scope of the following claims.

What is claimed is:

1. A method for operating a data processing system to control a device under test and to collect data therefrom, said method comprising the steps of:

providing a first display having a list of elementary tasks from which a user selects one or more elementary tasks using a pointing device, a first one of said tasks resulting in a signal being applied to said device under test when that task is executed by said data processing system and a second of said tasks resulting in said data processing system receiving data determined by the signals generated by said device under test;

providing a second display from which said user can edit parameters in said first one of said tasks and from which said user can order said selected tasks to provide a current test definition; and providing a graphical display element that causes said data processing system to execute each of said tasks in order in said current test definition, said data processing system storing any data received from said device under test as a result thereof in a data set; and storing information specifying said current test definition in said data set.

2. The method of claim 1 wherein said method further comprises the step of:

expanding said list of elementary tasks to include said current test definition as a new elementary task.

3. The method of claim 1 wherein said list of elementary tasks includes at least one task that causes said data processing system to apply an electrical signal to said device under test and to measure at least one signal generated by said device under test.

4. The method of claim 1 wherein said list of elementary tasks includes at least one task that controls the order in which said elementary tasks in said current test definition are executed by said data processing system.

5. The method of claim 1 wherein said list of elementary tasks includes at least one task that computes a numerical result based on data provided by another of said elementary tasks.

6. The method of claim 1 wherein said data processing system comprises a computer and a hardware interface, said hardware interface providing a bi-directional link between said computer and said device under test, said hardware interface receiving digital data defining an analog electrical signal to be applied to said device under test, said hardware interface further comprising data stored on said hardware interface defining the capabilities of said hardware interface including a maximum voltage range for said analog signal and a highest frequency signal that can be generated by said hardware interface, wherein at least one of said elementary tasks generates a signal to be applied to said device under test, wherein that task stores data specifying the voltage range and frequency needed to generate said signal, and wherein said method further comprises the step of determining if that one of said elementary tasks is included in said current test definition, and if said elementary task is in said current test definition, whether or not said required voltage range and frequency are within said capabilities of said hardware interface.

7. A method for operating a data processing system to control a device under test and to collect data therefrom, said method comprising the steps of:

providing a first display having a list of elementary tasks from which a user selects one or more elementary tasks using a pointing device, a first one of said tasks resulting in a signal being applied to said device under test when tat task is executed by said data processing system and a second of said tasks resulting in said data processing system receiving data determined by the signals generated by said device under test;

providing a second display from which said user can edit parameters in said first one of said tasks and from which said user can order said selected tasks to provide a current test definition;

providing a graphical display element that causes said data processing system to execute each of said tasks in order in said current test definition, said data processing system storing any data received from said device under test as a result thereof in a data set;

storing information specifying said current test definition in said data set; and expanding said list of elementary tasks to include said current test definition as a new elementary task, wherein the step of expanding said list of elementary tasks comprises dragging said current test definition from said second display to said first display using said pointing device.

8. A method for operating a data processing system to control a device under test and to collect data therefrom, said method comprising the steps of providing a first display having a list of elementary tasks from which a user selects one or more elementary tasks using a pointing device, a first one of said tasks resulting in a signal being applied to said device under test when that task is executed by said data processing system and a second of said tasks resulting in said data processing system receiving data determined by the signals generated by said device under test;

providing a second display from which said user can edit parameters in said first one of said tasks and from which said user can order said selected tasks to provide a current test definition; and providing a graphical display element that causes said data processing system to execute each of said tasks in order in said current test definition, said data processing system storing any data received from said device under test as a result thereof in a data set;

storing information specifying said current test definition in said data set; and providing a third display comprising a list of elementary tasks executed to generate said data set.

9. The method of claim 8 wherein said elementary tasks comprise objects in an object oriented computing model, wherein said second elementary task comprises a display method for displaying said data received from said device under test.

10. The method of claim 9 wherein said display method is executed when one of said elementary tasks in said list of elementary tasks in said third display is selected by said user.

11. The method of claim 8 further comprises the step of expanding said list of elementary tasks in said first display in response to said user dragging said current test definition from said third window to said first window, said current test definition becoming a new elementary task in said list of elementary tasks.

12. The method of claim 8 further comprising the step of exporting said data set to a computer file of a first type.

13. The method of claim 12 further comprising the step of importing one of said computer files of said first type to generate said data set.

14. A method for operating a data processing system to control a device under test and to collect data therefrom, said method comprising the steps of: providing providing a first display having a list of elementary tasks from which a user selects one or more elementary tasks using a pointing device, a first one of said tasks resulting in a signal being applied to said device under test when that task is executed by said data processing system and a second of said tasks resulting in said data processing system receiving data determined by the signals generated by said device under test;

providing a second display from which said user can edit parameters in said first one of said tasks and from which said user can order said selected tasks to provide a current test definition; and providing a graphical display element that causes said data processing system to execute each of said tasks in order in said current test definition, said data processing system storing any data received from said device under test as a result thereof in a data set; and storing information specifying said current test definition in said data set, wherein the data processing system stores a system identification number and wherein said list of elementary tasks comprises a third elementary task including an enabled identification number, said t elementary task being operative to cause said data processing system to apply signals to the device under test and collect data therefrom only if said system identification number matches said enabled identification number.

15. The method of claim 14 wherein said third elementary task comprises an object in an object oriented computing model, wherein said third elementary task comprises a method for displaying information collected in response to said data processing system executing a data collection method in said third elementary task to collect data that is stored in said third elementary task, and wherein said display method is operative even if said system identification number does not match said enabled identification number.

* * * * *

UNITED STATES PATENT AND TRADEMARK OFFICE
CERTIFICATE OF CORRECTION

PATENT NO. : 6,505,137 B1
DATED : January 7, 2003
INVENTOR(S) : Evans et al.

It is certified that error appears in the above-identified patent and that said Letters Patent is hereby corrected as shown below:

Column 9,
Line 41, replace "tat" with -- that --

Column 10,
Line 65, replace "t" with -- third --

Signed and Sealed this

Fifteenth Day of April, 2003

JAMES E. ROGAN
*Director of the United States Patent and Trademark Office*